(No Model.)
A. WERTS.
PIPE WRENCH.
No. 601,723. Patented Apr. 5, 1898.
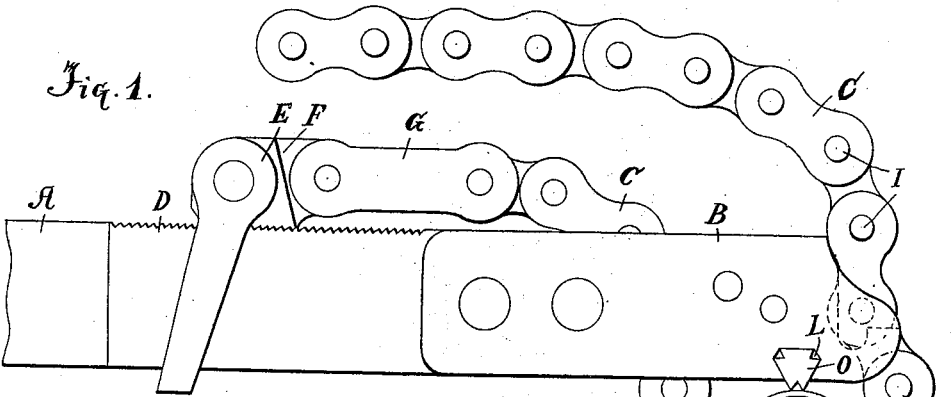
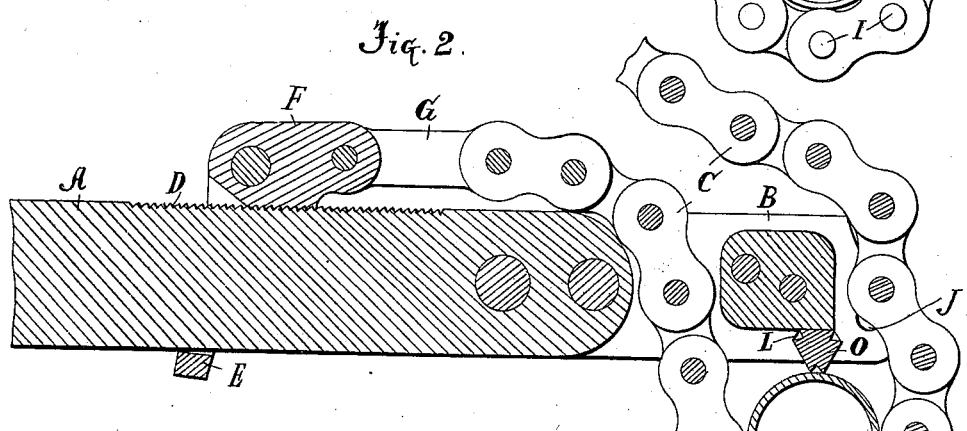
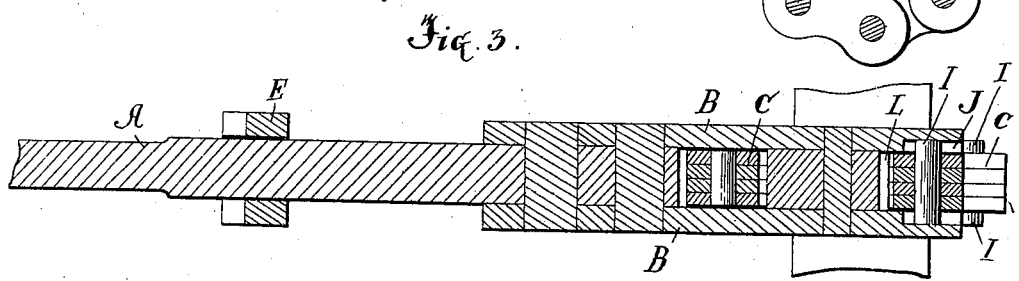
Witnesses
O. Seiffert
Rosann S. Smith
Inventor
Albert Werts,
per
Parker & Pierce
Attorney
THE NORRIS PETERS CO., PHOTO-LITHO., WASHINGTON, D. C.

UNITED STATES PATENT OFFICE.

ALBERT WERTS, OF CAMDEN, NEW JERSEY.

PIPE-WRENCH.

SPECIFICATION forming part of Letters Patent No. 601,723, dated April 5, 1898.

Application filed October 14, 1897. Serial No. 655,119. (No model.)

*To all whom it may concern:*

Be it known that I, ALBERT WERTS, a citizen of the United States, residing at Camden, in the county of Camden and State of New Jersey, have invented certain new and useful Improvements in Pipe-Wrenches; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in pipe-wrenches; and it consists in a handle or lever having a slot or opening through its inner end and provided with a series of teeth upon its upper edge and a recess in its inner end to receive the pivots upon the links, combined with a sliding clutch provided with teeth to engage with the teeth upon the upper edge of the lever, a chain connected to the clutch and having its links provided with pivotal points, and a suitable sharp-edged bearing that is inserted in a suitable socket made therefor, all of which will be more fully described hereinafter.

The object of my invention is to provide a pipe-wrench in which the chain is made adjustable from both ends, so that it is equally well adapted to pipes of every size, and in which the sharp-edged bearing is made reversible, so that when one edge becomes dull it can be changed so as to bring another one into play.

In the accompanying drawings, Figure 1 is a side elevation of the inner portion of the wrench, which is applied to a pipe. Fig. 2 is a vertical longitudinal section, and Fig. 3 a horizontal section, of the same.

A represents the handle or lever, which will be of any desired length and which is provided with the two jaws B at its inner end, which are separated just sufficiently far apart to allow the chain C to freely pass between them. The inner ends of these jaws form shoulders which serve as stops for the slide. Upon the upper edge of the handle, at any suitable distance from the opening or slot through the inner end of the handle, are formed a series of fine teeth D, of any suitable shape, and moving freely back and forth over the toothed portion of this lever is the slide or keeper E, which is U-shaped and has pivoted between its upper ends the clutch F, which is also provided with teeth to engage with those on the edge of the lever. Connected to this clutch by a long link G is the chain C, of any suitable construction, which passes down through the slot or opening in the inner end of the lever, and which chain has no pivotal points or bearings upon the first three or four links, which play back and forth through the slot in order to allow the clutch to be adjusted back and forth upon the lever; but all of the other links are provided with two pivotal or bearing points I. The lower inner corners of the lever are cut away, and formed in the inner sides of each of these jaws is a suitable recess or cavity J, in which any one of the pivotal points upon the links may be made to catch after the chain has been passed around the pipe.

Formed in the lower edges of the two jaws, just back of the bearing-cavity, are the sockets L, in which the sharp-edged bearing O is placed. This bearing is made triangular and each point or corner is provided with two sharp teeth, which are intended to bite into the pipe while the wrench is in use. This bearing is made triangular in shape so that when any two of the sharp edges become dulled or injured this bearing can be knocked endwise out of its socket and turned partially around and then replaced.

The chain being adjustable at both of its ends can be applied with equal facility to pipes of the largest size or when not thicker than a lead-pencil. After the chain has been fastened around the pipe or rod it is only necessary to move the clutch back by hand upon the lever to tighten the chain around the pipe or rod to the desired degree. In order to make adjustment by means of the chain, it is only necessary to raise the pivot upon the link that is in position from the bearing or cavity and change to another pivot, which will either tighten or loosen the chain, as may be desired. When the chain is first fastened in position, the clutch should be at the inner end of the teeth, and then if the chain does not fit with sufficient tightness against the pipe or rod the clutch is moved backward by hand, so as to take up the slack. The chain being made adjustable at each end, the wrench can be used upon pipes and rods of all sizes with equal facility.

Having thus described my invention, I claim—

1. In a pipe-wrench, a lever provided with teeth upon its edge, and jaws upon its inner end, combined with a chain, a movable clutch to which the inner end of the chain is attached, and a sharp-edged bearing in the lower edge of the lever; the chain being provided with pivotal points, and the inner sides of the jaws with cavities to receive the pivots, substantially as set forth.

2. In a pipe-wrench, the lever provided with sockets in its lower edge, and the triangular bearing provided with sharp points or teeth, and means for clamping the pipe or rod against the sharp edge of this bearing, substantially as specified.

3. In a pipe-wrench, a lever provided with teeth upon its inner end, a slide or keeper placed thereon, a clutch pivoted thereto and adapted to engage with the teeth, and a chain loosely connected to the clutch and passing down between the two jaws, combined with a sharp-edged bearing upon the lower edge of the lever; the inner sides of the jaws being provided with a cavity, and the links of the chain being provided with pivotal points or bearings which catch in the cavity, whereby the chain can be adjusted from either end, substantially as shown and described.

In testimony whereof I affix my signature in presence of two witnesses.

ALBERT WERTS.

Witnesses:
WILLIAM WERTS,
KATHRYN C. MICHAEL.